(12) United States Patent
Rudd et al.

(10) Patent No.: US 6,288,786 B1
(45) Date of Patent: Sep. 11, 2001

(54) DIGITAL RANGE SENSOR SYSTEM

(75) Inventors: Eric P. Rudd, Hopkins; William P. Kennedy, Golden Valley; Troy R. Pesola, Champlin; David D. Madsen, Lakeland, all of MN (US)

(73) Assignee: CyberOptics Corporation, Minneapolis, MN (US)

( * ) Notice: Subject to any disclaimer, the term of this patent is extended or adjusted under 35 U.S.C. 154(b) by 0 days.

(21) Appl. No.: 09/517,677

(22) Filed: Mar. 2, 2000

Related U.S. Application Data

(62) Division of application No. 09/389,539, filed on Sep. 3, 1999, which is a continuation of application No. 09/039,819, filed on Mar. 16, 1998, now abandoned.

(51) Int. Cl.$^7$ .................................................. G01B 11/14
(52) U.S. Cl. .............................................................. 356/623
(58) Field of Search ................................... 356/373, 375, 356/376, 614, 623; 359/507, 511

(56) References Cited

U.S. PATENT DOCUMENTS

| | | |
|---|---|---|
| 3,497,259 | 2/1970 | Oberheuser . |
| 3,661,465 | 5/1972 | Groh . |
| 3,799,652 | 3/1974 | Torguet . |
| 4,017,160 | 4/1977 | Betensky . |
| 4,059,343 | 11/1977 | Kowalski et al. . |
| 4,084,881 | 4/1978 | Hirabayashi et al. . |
| 4,170,401 | 10/1979 | Yoder, Jr. et al. . |
| 4,436,260 | 3/1984 | Donelan . |
| 4,488,813 | 12/1984 | Kissinger et al. . |
| 4,531,833 | 7/1985 | Ohtomo . |
| 4,560,271 | 12/1985 | Fumio . |
| 4,575,237 | 3/1986 | Suzuki . |
| 4,687,322 | 8/1987 | Tanimoto et al. . |
| 4,729,653 | 3/1988 | Kobayashi . |
| 4,733,969 | 3/1988 | Case et al. . |
| 4,746,790 | 5/1988 | Sorimachi . |

(List continued on next page.)

FOREIGN PATENT DOCUMENTS

| | | |
|---|---|---|
| 59-202010(A) | 11/1984 | (JP) . |
| 60-20111(A) | 2/1985 | (JP) . |
| 60-189720(A) | 9/1985 | (JP) . |
| 1-253603 | 10/1989 | (JP) . |
| 4-166786 * | 6/1992 | (JP) . |

OTHER PUBLICATIONS

Dorsch et al., "Laser triangulation: fundamental uncertainty in distance measurement," Applied Optics, vol. 33, No. 7. Mar. 1, 1994, pp. 1306–1314.

Baribeau and Rioux, "Centroid fluctuations of speckled targets," Applied Optics, vol. 30, No. 26, Sep. 10, 1991, pp. 3752–3755.

Baribeau and Rioux, "Influence of speckle on laser range finders," Applied Optics, vol. 30, No. 20, Jul. 10, 1991, pp. 2873–2878.

Rezulski, "Vignetting in electro–optical distance meters," Optics and Laser Technology, vol. 18, No. 2, Apr., 1986, pp. 95–98.

Furman et al., "Semiconductor Range–Finding System," IBM Technical Disclosure Bulletin, vol. 16, No. 1, Jun. 1973, pp. 44–46.

Primary Examiner—F. L. Evans
(74) Attorney, Agent, or Firm—Dicke, Billig & Czaja, P.A.

(57) ABSTRACT

A digital range sensor comprises a light source, an optical element to focus the light from the source down to a small spot on a target, a second optical element that is mounted obliquely from the source axis, and a prism mounted on a multi-element detector, which in turn is mounted at the focus of the light returning from the target. The purpose of the prism on the detector is to direct the light onto the active surface of the detector at an angle closer to normal incidence than would otherwise be possible. The detector produces digital data which is transferred to a control module for processing and to produce a numerical range measurement.

21 Claims, 13 Drawing Sheets

U.S. PATENT DOCUMENTS

| | | |
|---|---|---|
| 4,770,507 | 9/1988 | Arimoto et al. . |
| 4,872,747 | 10/1989 | Jalkio et al. . |
| 4,891,772 | 1/1990 | Case et al. . |
| 4,967,066 * | 10/1990 | Beraldin et al. .................... 250/205 |
| 5,056,922 | 10/1991 | Cielo et al. . |
| 5,076,698 | 12/1991 | Smith et al. . |
| 5,118,957 | 6/1992 | Kawashima et al. . |
| 5,218,415 | 6/1993 | Kawashima . |
| 5,272,501 | 12/1993 | Nishi et al. . |
| 5,510,625 * | 4/1996 | Pryor et al. .................... 250/559.23 |
| 5,530,548 * | 6/1996 | Campbell et al. .................... 356/375 |
| 5,627,635 | 5/1997 | Dewan . |
| 5,633,721 | 5/1997 | Mizutani . |
| 5,689,328 * | 11/1997 | Katayama .......................... 359/507 |
| 5,806,020 * | 9/1998 | Zykan .................................. 702/159 |

* cited by examiner

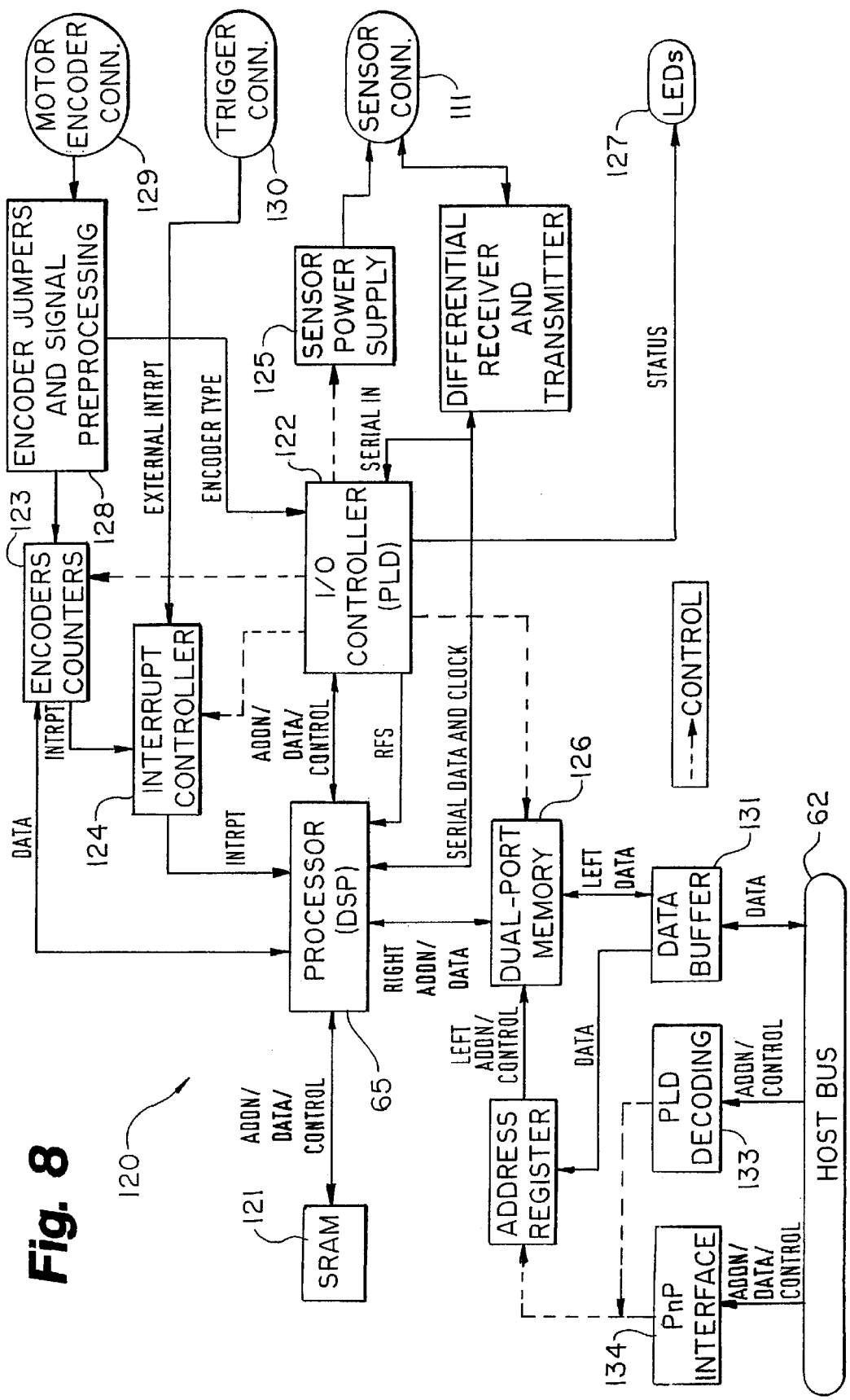

DIGITAL RANGE SENSOR SYSTEM

This is a Division of application Ser. No. 09/389,539 filed Sep. 3, 1999 which in turn is a continuation of application Ser. No. 09/039,819 filed Mar. 16, 1998, now abandoned.

FIELD OF THE INVENTION

The invention relates to light based range sensors, usually laser based range sensors, that make high precision optical measurements of surfaces having varying profiles and varying degrees of reflectivity. More specifically, the invention relates to non-contact sensors that optically measure the distance from the sensor head to the surface under test.

BACKGROUND OF THE INVENTION

High-precision surface-profiling devices of the past have been primarily of the contact type. A spherical ruby stylus (of radius typically 1 mm) is used to probe he surface under test. In some systems, the deflection of the probe is measured by the closure of a mechanical microswitch; in other systems, the deflection is measured capacitively. Although such probes can be exceedingly accurate on suitable materials, the range of suitable materials is limited. Inaccurate readings or damage may occur if the sample is unsuitable. Examples of unsuitable samples include: soft, liquid, or sticky materials, very thin samples that would deform under stylus pressure, samples with concavities of radius smaller than the tip radius, or samples that are hazardous to touch. Additionally, in order to minimize probe and sample wear, the speed of measurement must be made low.

As an alternative to the electro-mechanical controllers and ruby-tipped contact probes, several types of measurement systems have been developed using optical triangulation. U.S. Pat. No. 4,733,969 discloses a laser probe for determining distance from the probe to the test object by projecting laser light onto a target surface through a source lens. The light is reflected from the target surface through a receiving lens and directed onto a pair of detectors. Light falling on the first detector indicates that the sensor (or probe) is within range for making a measurement. Light falling equally on, or in a predetermined proportion on, the two detectors indicates that a trigger point is reached and a coordinate measurement should be taken. Light falling off the second detector indicates that the sensor is no longer in range for measurements. The probe is able to focus the laser beam to approximately 0.001 inches. Alternatively, a cylindrical lens may be incorporated to project a stripe pattern onto the target object. The laser probe may be produced in a compact configuration using a reflecting mirror and additional focusing lenses. The advantages of this laser probe include the ability to integrate with existing coordinate measuring machines, the production of a very small spot size for measurement of very small and detailed objects, and a probe response speed that is fast and accurate. Unfortunately, this device only provides a binary comparison of distance against a pre-determined reference, whereas a numerical range reading would be more generally useful.

U.S. Pat. No. 4,891,772 and 4,872,747 describe a point and line range sensor that produces a numerical range reading based on optical triangulation. Once again, laser light is directed onto a target surface. The light reflected from the target surface is passed through a collimating lens to create a spot of light on a suitable multi-element detector, and the position of the spot of light is analyzed.

A key feature of the apparatus disclosed in U.S. Pat. No. 4,891,772 and 4,872,747 is the use of prisms to produce anamorphic magnification. This technique makes the instrument much more compact, while allowing the light to remain concentrated, which improves the performance of the instrument. After the returning light has passed through the collimating lens, it is directed toward the roughly-perpendicular face of a prism. The light exits the prism at a steep angle providing large angular magnification. A focusing lens directs the exiting collimated light onto the surface of a detector and a range measurement is determined. Alternatively, and preferably, two prisms are used, each providing approximately equal magnification. This scheme provides better performance than a single prism, since the dispersion and distortion from the first prism can be largely canceled by opposite dispersion and distortion from the second prism. The second prism may be oriented to provide total internal reflection, which can further reduce package size. The advantages of this system include the avoidance of contact with the target object, a small package size and the ability to maintain post-magnification light levels at substantially higher levels than non-anamorphic systems.

At least one limitation of the apparatus of U.S. Pat. Nos. 4,891,772 and 4,872,747 is that the anamorphic magnification results in considerable field-dependent astigmatism. This causes the spot on the detector to widen toward the ends of the working range of the sensor, which increases the uncertainty of the spot location. The astigmatism arises from fundamental characteristics of image formation from tilted planes, and cannot be reduced by any simple optimization of surface radii and tilts.

U.S. Pat. No. 5,633,721 describes a surface-position detection apparatus that uses optical triangulation to measure the location of a pattern of light directed onto a target surface. The return light from the pattern is collected and analyzed by a receiving optical system, consisting of a focusing lens, a prism or grating, a relay lens, and a spatially-sensitive detector. The focusing lens forms an image of the pattern on the surface of the prism or grating, and this image is re-focused onto the detector by the relay lens. The target surface, the focusing lens, and the front prism surface are tilted so as to satisfy the Scheimpflug condition. The prism serves to refract the image of the pattern and to reduce the obliquity of the final image.

Limitations on the technology disclosed in U.S. Pat. No. 5,633,721 relate to the prism. The front surface of the prism lies in an image plane and as such, any dust or surface defects on the prism appear in sharp focus on the detector, and can easily cause objectionable image degradation. Additionally, because the image is formed on the front surface of the prism an additional optical device (a relay lens) must be included, which adds to the bulk, weight and complexity in assembling the sensor system.

Moreover, each of the above patents faces the problem of limited range resolution. A fundamental limit on range resolution is imposed by the presence of speckle. Speckle is a well-known interference phenomenon observed with coherent sources, where irregularities in a surface placed in the optical path give rise to a characteristic granular spatial variation in the light intensity. Since this granularity persists despite focusing of the light, it places a fundamental limit on the resolution of laser triangulation sensors. The phenomenon of speckle, as it relates to optical triangulation, was analyzed in a paper entitled "Laser Triangulation; Fundamental Uncertainty in Distance Measurement by Rainer G. Dorsch, Gerd Häusler, and Jürgen Herrmann (*Applied Optics*, Vol. 33 (1994) pp. 1306–1314). The conclusion reached in the analysis was that, in order to reduce or eliminate the phenomenon of speckle, the object-space numerical aperture of the receiver lens must be maximized for optimal performance. The above-described surface measurement system patents did not address the maximization of numerical aperture. Due to neglect of this important factor, earlier sensors had limited range-to-resolution ratios, typically in the range of only 400:1.

Further, each of the above-described patents is only able to take and process a single surface measurement at a time. In other words, each of the above-described optical systems is designed so that the detector may detect only one spot of light, that is reflected from the target surface at a time.

In view of the above, there is a need for an optical sensor system that can produce precise measurements by reducing speckle through numerical aperture adjustment, that has improved range-to-resolution and range-to-accuracy ratios and that can determine multiple spots of light on the detector, which would enable it to make thickness measurements of transparent objects.

SUMMARY OF THE INVENTION

The problems described above are in large measure solved by the digital range sensor of the present invention. The digital range sensor comprises a light source, an optical element to focus the light from the source down to a small spot on a target, a second optical element that is mounted obliquely from the source axis, and a prism mounted on a multi-element detector, which in turn is mounted at the focus of the light returning from the target. The purpose of the prism on the detector is to direct the light onto the active surface of the detector at an angle closer to normal incidence than would otherwise be possible. The detector circuitry produces digital data which is transferred to a control module for processing and for producing a range measurement in millimeters.

It is an object and advantage of the present invention to produce a thickness measurement by the use of a single sensor and dynamic threshold control.

It is an object and advantage of the present invention to use a larger object-space numerical aperture than other comparable sensors, which reduces speckle size and reduces uncertainty in the range of measurement.

It is an object and advantage of the present invention to provide an improved range-to-resolution ratio on the order of 2000:1, compared to previous systems having a ratio of 400:1 as well as an improved range-to-accuracy ratio on the order of 200:1. With these improved ratios, the sensor of the present invention is more versatile than previous sensors, having a longer working range, and as such, reduces the number of sensors a customer must buy.

It is yet another object and advantage of the present invention to enable the sensor to communicate with a digital signal processor through use of a digital signal processing (DSP) serial port.

It is still another object and advantage of the present invention to provide a sensor that is flippable/symmetrical allowing for alternative mounting choices as well as stackable allowing for stacking similar and/or different sensors. Further, the sensor housing preferably incorporates precision mounting holes, pin and mount locating features, for repeatability in mounting.

It is another object and advantage of the present invention to produce a sensor having lower power dissipation than previously achieved.

Other objects and advantages of the present invention include: (1) storing calibration information within the sensor itself such that when the sensor is connected to a control module, the control module may detect the type of sensor present, thereby allowing easy interchangeability of sensors with a single controller card; (2) the ability of the control module to connect directly into an ISA bus of an IBM-compatible computer, allowing for faster data transfer than that of a previously known and used RS-232 interface.

DESCRIPTION OF THE DRAWINGS

FIG. 8 depicts a block diagram of the control module electronics of the present invention.

DESCRIPTION OF THE PREFERRED EMBODIMENTS

Figure 1:
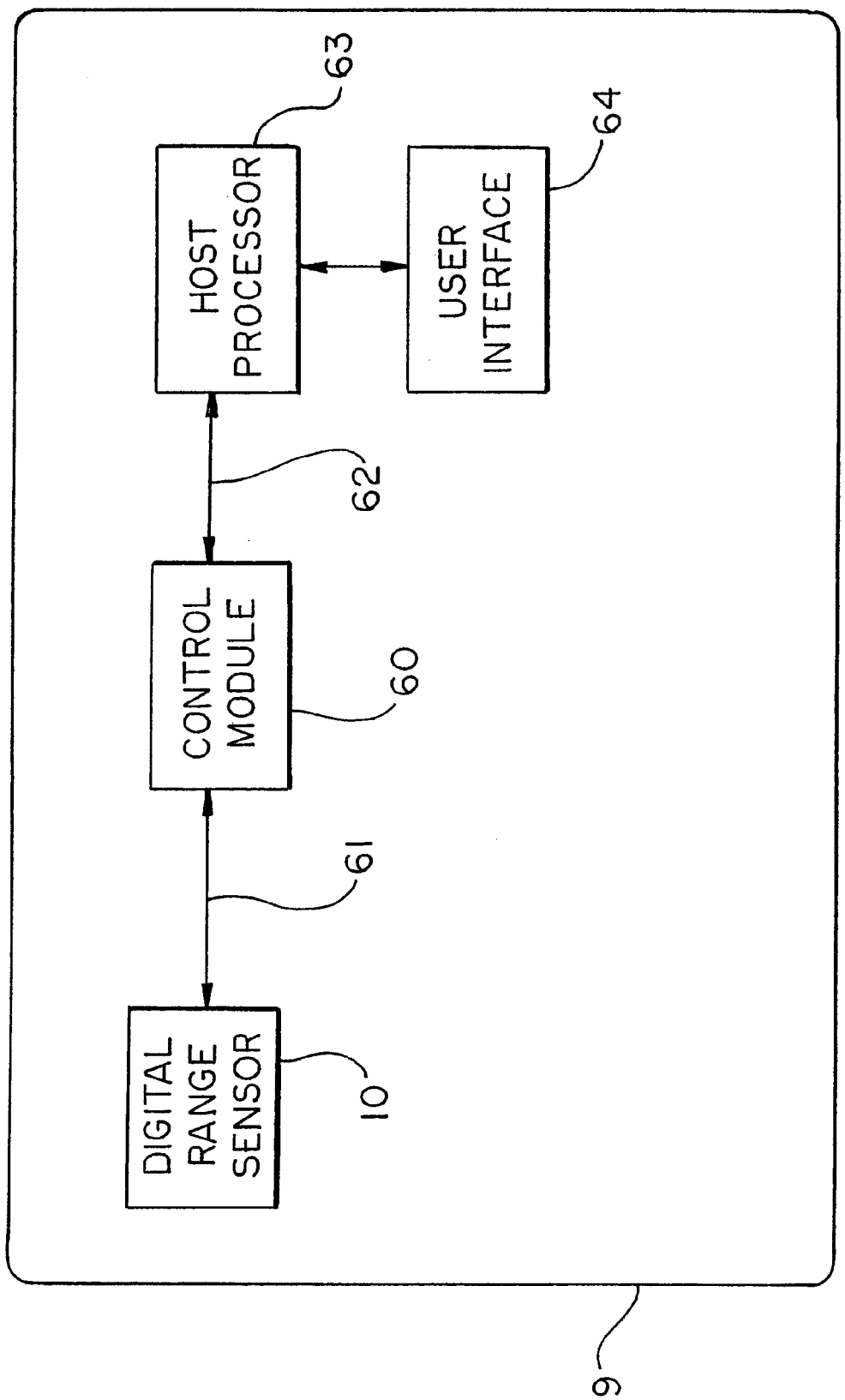
FIG. 1 is a block diagram of a digital range sensor system of the present invention.

FIG. 1 depicts the basic components of a digital range sensor system 9 of the present invention. Digital range sensor system 9 preferably comprises a digital range sensor 10, a control module 60, a host processor 63, and a user interface 64. Digital range sensor 10 is communicatively coupled to control module 60. Control module 60 is communicatively coupled to host processor 63 which is connected to user interface 64.

Figure 2:
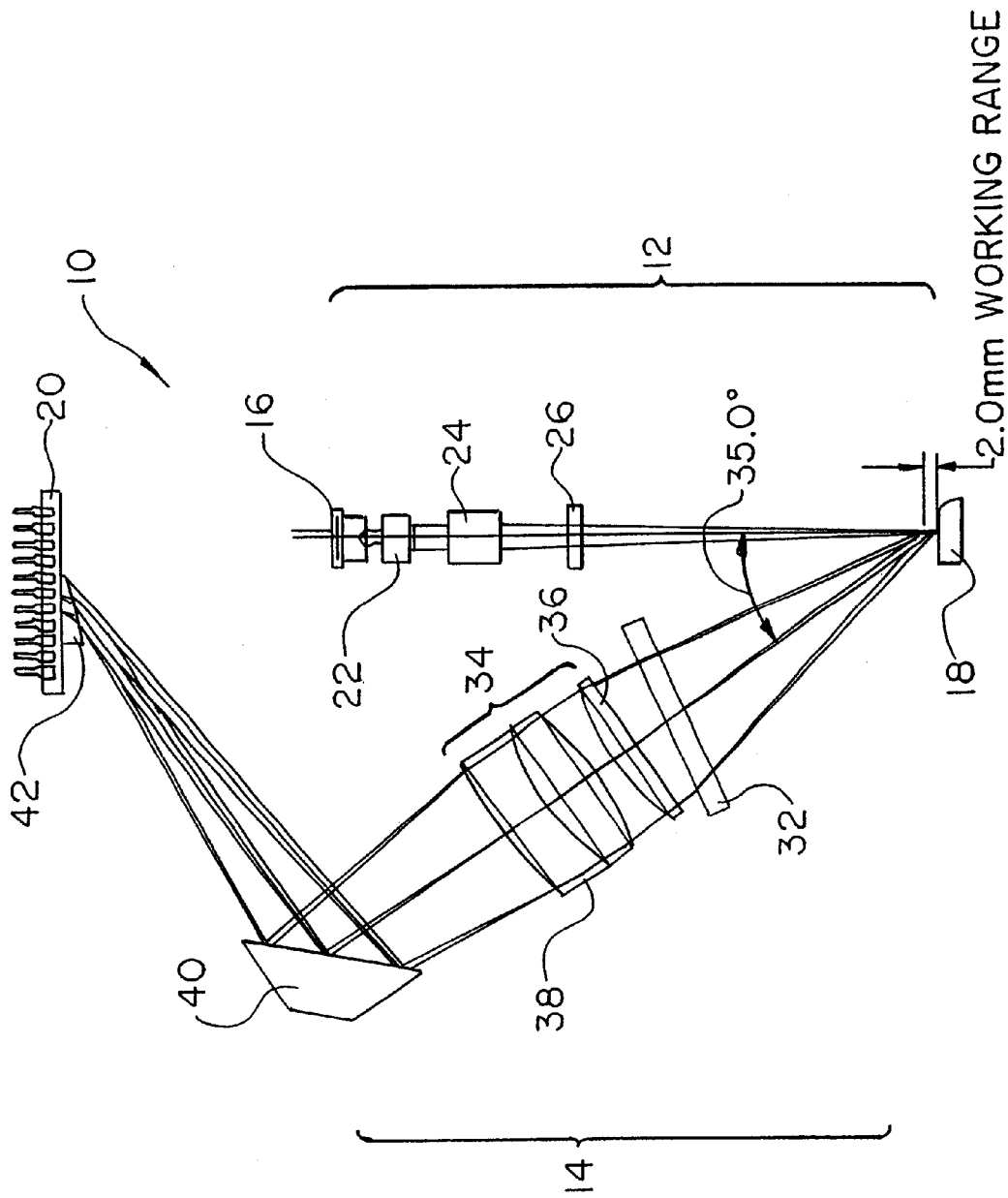
FIG. 2 is the optical layout of a digital range sensor of the present invention that utilizes the presence of diffuse light.
Figure 3:
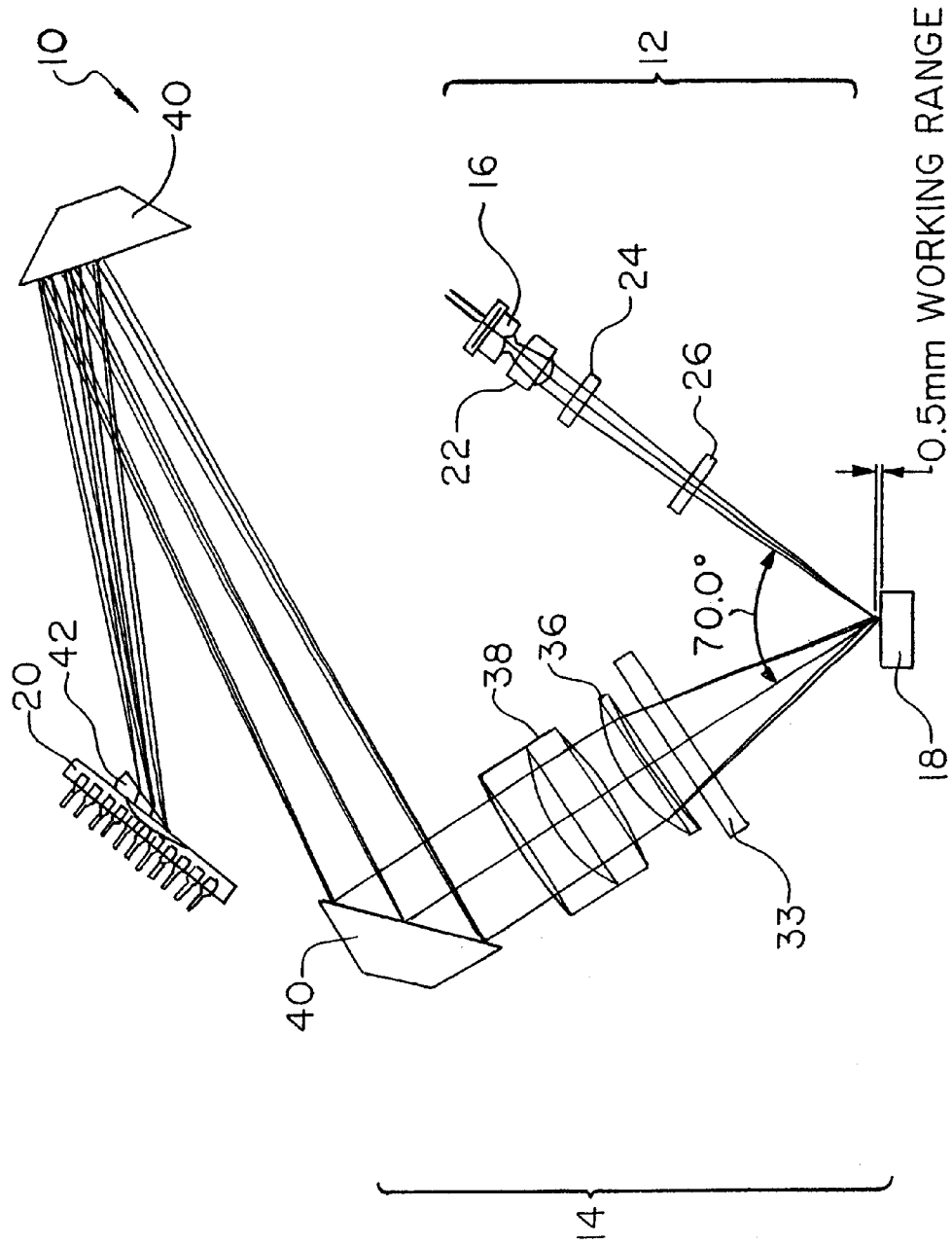
FIG. 3 is an alternative embodiment of the present invention that utilizes the presence of specular light.

Referring to FIGS. 2 and 3, two optical designs for digital range sensor 10 may be appreciated. Each of the optical designs for sensor 10 have a designated optimal working range; however, numerous other sensors with different working ranges may be created by applying the principles described below. The designated optimal working range of the optical design of FIG. 2 is approximately 2.0 mm while that of FIG. 3 is approximately 0.5 mm.

The optical design for digital range sensor 10 may be divided into two optical trains, a transmitter 12 and a receiver 14. Transmitter 12 generally comprises a laser diode 16, or other appropriate light source including coherent and non-coherent light sources, and a plurality of focusing elements to project a spot of light onto a target 18. Receiver 14 generally comprises a plurality of light gathering optics to collect the light that is scattered by target 18 and to focus the light into a spot on a detector 20.

Transmitter 12 preferably produces a spot on target 18 at a desired standoff distance from target 18, over the working range of sensor 10. This is preferably accomplished with laser diode 16, a collimating lens 22, and a focusing lens 24. An RG630 filter 26 may be placed at the output of the transmit path to seal sensor case 27 (shown in FIG. 6) and to cosmetically enhance the appearance of sensor case 27. The embodiment of FIG. 3 shows an instance where transmitter 12 produces a spot on target 18 that is at an angle of approximately 35° to the target surface. The embodiment of FIG. 2 is a diffuse sensor that uses light scattered from target 18 for sensing the range of target 18 while the embodiment of FIG. 3 uses the light specularly reflected directly into the sensor for sensing the range of target 18.

Laser diode 16 is preferably a 10 mW, 670 nm device. Such a laser diode is manufactured by Toshiba under part number TOLD9225. In order to meet the CDRH (Center for Devices and Radiological Health) laser II classification of 1 mW maximum output, the peak output of laser diode 16 is set to 950 μW. Light emitted from laser diode 16 is quite divergent and must be collimated. Collimating lens 22 is preferably a molded glass aspheric lens. An appropriate lens is manufactured by Geltech and has part number 350110-B; this lens preferably includes an anti-reflection coating for 670 nm.

Collimated light is then focused to a spot, which is the stylus to probe the target 18 surface under test. The focusing lens 24 is preferably a BK7 plano convex lens with an appropriate effective focal length (EFL); focusing lens 24 of FIG. 2 preferably has an EFL of 70 mm and focusing lens 24 of FIG. 3 preferably has an EFL of 55 mm. The focal length of focusing lens 24 is chosen to deliver the proper spot diameter at the ends and center of the working range of digital range sensor 10. In the embodiment of FIG. 2, the image space numerical aperture (NA) of focusing lens 24 is preferably approximately 0.025 which allows sensor 10 to achieve a desirable spot diameter of approximately 30 μm in the center of its 2.0 mm working range and a slightly larger spot diameter of approximately 60 μm at the ends of the working range. In the embodiment of FIG. 3, the image space NA of focusing lens 24 is preferably approximately 0.035 which achieves a desirable spot diameter of approximately 16 μm in the center of the 0.5 mm working range and a slight larger spot diameter of 23 μm at the ends of the working range.

Output filter 26 is preferably a red glass filter made from RG630 material. As explained earlier, the purpose of the filter is mainly cosmetic. The filter 26 covers the output aperture of the transmitter 12 providing a uniform appearance with the receive aperture. Output filter 26 also seals the case 27 of the sensor 10 to protect it from dust.

Receiver 14 is an off-axis optical system due to the triangulation angle of the embodiments; FIG. 2 has a triangulation angle of approximately 35° and FIG. 3 has a triangulation angle of approximately 70°. Because the triangulation angle is not 90°, receiver 14 requires a tilted image to satisfy the Scheimpflug condition. The optical system of receiver 14 preferably comprises a filter 32, a triplet lens assembly 34 with one meniscus 36 and a cemented doublet 38, a front surface mirror 40, and a 15 degree prism 42 mounted to detector 20. In the embodiments of FIGS. 2 and 3, the optical system of receiver 14 preferably incorporates an object space numerical aperture (NA) of approximately 0.2 to help reduce the adverse effects of speckle.

In determining the maximum optimal NA, the following equation, from Dorsch et al., for the standard height deviation (σ) of a single height measurement is used:

$$\sigma = \frac{\lambda}{2\pi \sin u \sin \theta} \quad (1)$$

where:
λ is the wavelength of the light
sin(u) is the numerical aperture of the system and
θ is the triangulation angle of the system
u=atan (CA/2s)
where:
CA is the clear aperture and
s is the target distance from the target to the CA This equation yields the best case situation for a target 18 that is dominated by speckle. Performance may be even better if target 18 does not exhibit speckle. Numerical aperture (NA) is selected as a trade-off between the performance desired, the size of sensor 10, standoff and the cost of the optics.

One difficulty with large numerical aperture systems is that aberrations are more difficult to control. In order to control these aberrations, specifically coma, filter 32 in the embodiment of FIG. 2 is tilted slightly. In the embodiments of FIG. 3, tilting of filter 32 is not required because the performance of these optical systems are not dominated by coma. Filter 32 is preferably an optical filter that is used to block out unwanted wavelengths of light minimizing the stray light sensitivity of sensor 10. Filter 32 also provides a means for sealing the sensor case 27 from dust.

The optical system of receiver 14 is designed with triplet lens assembly 34. Triplet lens assembly 34 preferably comprises positive meniscus lens 36 and cemented doublet 38 having an air space between that is optimized for the finite conjugates (target and image distances) which are preferably used for the mapping of the working range onto detector 20. In the embodiment of FIG. 2, meniscus lens 36 preferably has an effective focal length (EFL) of 57 mm while doublet 38 preferably has an EFL of 118 mm. In the embodiment of FIG. 3, meniscus lens 36 preferably has an EFL of 51 mm while doublet 38 preferably has an EFL of 124 mm.

Light rays emitting from triplet lens assembly 34 are directed toward detector 20 with front surface mirror 40. Front surface mirror 40 is not essential to receiver 14 but may be used to turn the light rays to create a more compact sensor 10 package. In the embodiment of FIG. 2, a single front surface mirror is used to turn the light rays by approximately 90°, while the embodiment of FIG. 3 uses two front surface mirrors to twice turn the light rays by approximately 90° to achieve a smaller sensor package.

Detector 20 is preferably metal-oxide semiconductor (MOS) device that is a 256 element linear array having 25 micron by 500 micron pixel elements. Such a detector is manufactured by Hamamatsu and has part number S3923-256Q. While a 256 element Hamamatsu detector is the preferred detector, numerous other detectors may be used without departing from the spirit or scope of the invention. For example, a 512 or 1024 element linear array detector might also be used. Because detector 20 may run on approximately +5V, as compared to previous CCD array detectors requiring +15V, the number of power supply connections are reduced. As well, sensor 10 has much lower power dissipation, generally in the range of 0.4 to 1.0 W, than previous sensors utilizing CCD array detectors which typically had power dissipation levels approaching 4 W. The lower power dissipation of the present invention provides for better component reliability; components are more likely to fail at higher temperatures. Further, lower power dissipation provides dimensional stability to sensor 10 which is important when measuring down to values such as 1 µm. As to dimensional stability, high power dissipation causes differential changes in the components, causes bonds in components to delaminate, and puts stress on joints of the components.

In order to keep the received light spot in focus on detector 20 throughout the working range of sensor 10, the well-known Scheimpflug condition must be met. Given a desired magnification and tilt of the image plane, the Scheimpflug condition prescribes the inclination of detector 20 which allows the image to be in focus throughout the entire working range of the sensor. In the case of high magnifications, the prescribed detector inclination can be extreme. In the instance of FIG. 2, the Scheimpflug condition prescribes an inclination angle for detector 20 of 70° with respect to the optical axis of receiver 14. This large obliquity is greatly disadvantageous in that reflective losses at the cover glass of detector 20 and the surface of detector 20 are greatly increased. As well, double reflections tend to cause ghost images on detector 20 and further, most detector packages, such as detector 20, tend to partially occlude light from such oblique angles.

Figure 4:
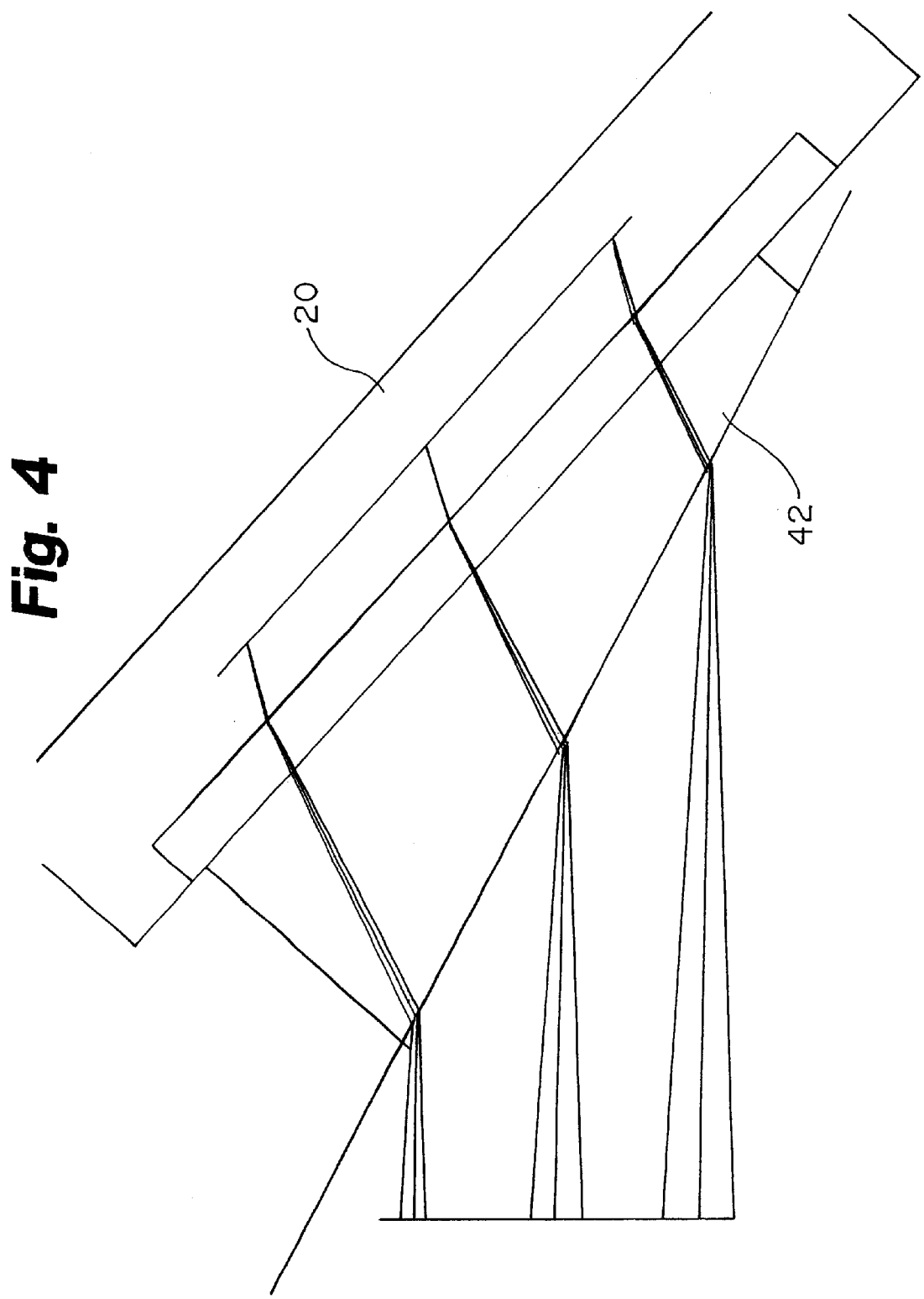
FIG. 4 provides a close-up view of a prism and detector of the digital range sensor.

To counteract these problems, prism 42 is preferably affixed to a window of detector 20 with a suitable optical adhesive. Prism 42 is preferably a 15 degree prism which acts to substantially reduce the incident angle in receiver 14. In the embodiment of FIG. 2, prism 42 reduces the incident angle from 70° to 23°. In the embodiment of FIG. 3, prism 42 reduces the incident angle from approximately 63° to 23°. Prism 42 preferably has a flat front face which obviates the problem of occlusion. Further, prism 42 preferably has a much lower index of refraction than that of silicon detectors, which are commonly used for detecting light, so that reflective losses at the front surface of prism 42 are not excessive. Additionally, light emerging from prism 42 strikes detector 20 at close to normal incidence, which greatly reduces problems with reflective losses and ghosts at detector 20, see FIG. 4. The reflected image of target 18 is not formed on the front face of prism 42 but rather is focused beyond prism 42 at the surface of detector 20; in other words, prism 42 itself is not at an angle to meet the Scheimpflug condition. Because prism 42 is not in the image plane, the effects of dust and surface defects on prism 42 are reduced. The use of prism 42 has the added benefit of adding anamorphic magnification in the optical axis of receiver 14 which reduces the magnification requirements of the optical system of receiver 14. This results in a smaller package size by having the image space conjugate shorter in extent. Other appropriate optical elements may be used in place of prism 42 without departing from the spirit or scope of the invention. For example, a grating or computer generated hologram might be used.

The optical design of sensor 10, described above, produces a sensor with improved range-to-resolution and range-to-accuracy ratios. The embodiment of FIG. 2 has a range-to-resolution ratio on the order of 2000:1 compared to earlier sensors having range-to-resolution ratios on the order of 400:1. Additionally, the embodiments of FIG. 2 has a range-to-accuracy ratios on the order of 200:1. The embodiment of FIG. 3 has a range-to-resolution ratio on the order of 4000:1 and a range-to-accuracy ratio of 500:1. Test data from each of the embodiments provided in table 1 below supports the ratios and improves upon them.

TABLE 1

| Working Range | Resolution (µm) | Range-to-Resolution | Accuracy (µm) | Range-to-Accuracy |
|---|---|---|---|---|
| Sample 1 2.0 mm | 0.68 | 2941:1 | 3.7 | 540:1 |
| Sample 2 2.0 mm | 0.69 | 2898:1 | 3.3 | 606:1 |
| Sample 1 0.5 mm | 0.09 | 5,555:1 | 0.9 | 555:1 |
| Sample 2 0.5 mm | 0.05 | 10,000:1 | 1.0 | 500:1 |

Figure 5:
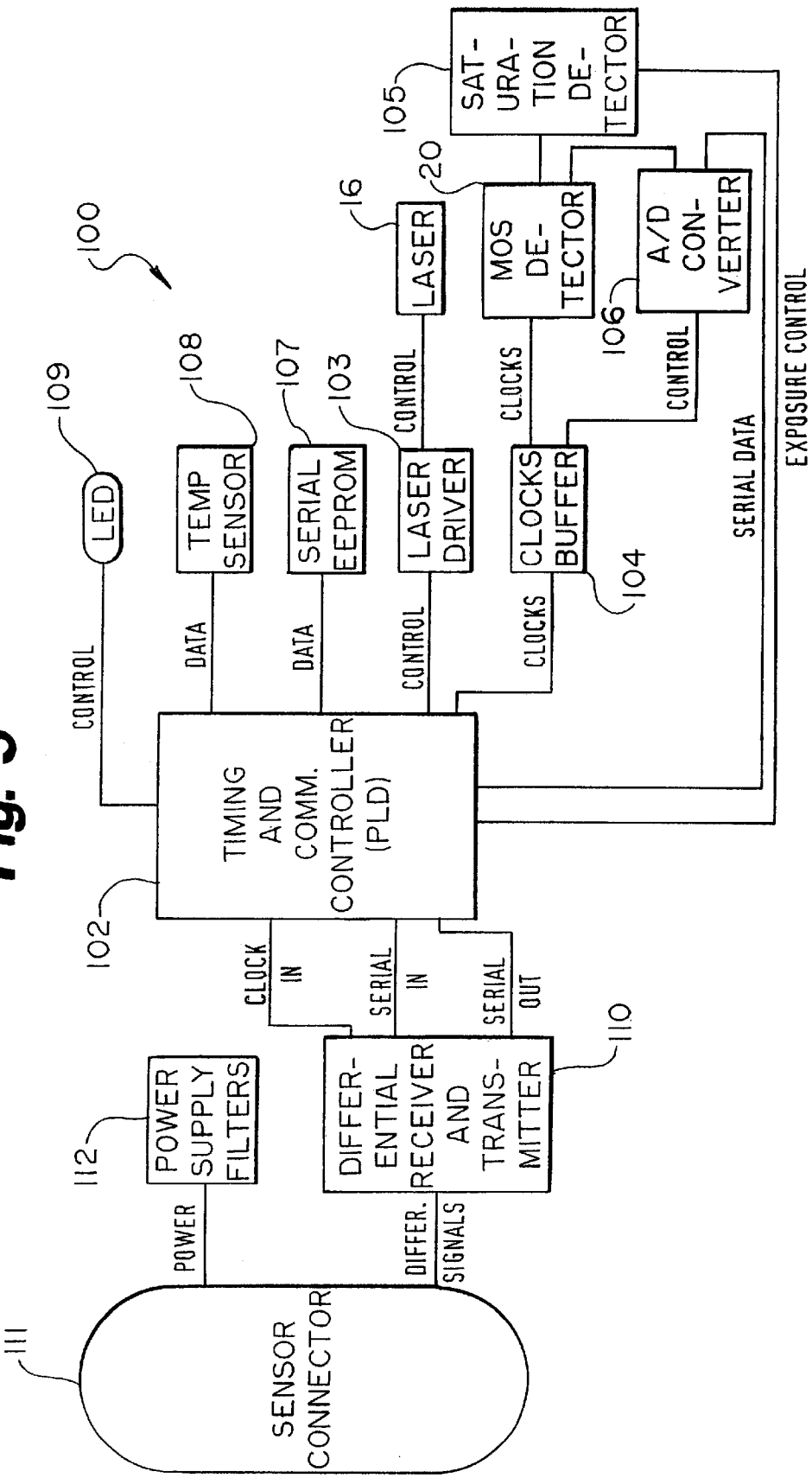
FIG. 5 depicts a block diagram of the sensor electronics of the present invention.

In addition to the elements described above, sensor 10, preferably incorporates suitable drive and interface electronics as indicated in the block diagram of FIG. 5. Sensor electronics 100 use a timing and communications controller 102, which is a programmable logic device (PLD), to control the operations of sensor 10. Controller 102 is communicatively coupled to laser 16 through laser driver 103. Clock signals from controller 102 are communicatively coupled through clock buffer 104 to detector 20. The saturation status of detector 20, as reported by saturation detector 105, is returned to controller 102. Detector analog video signals are communicatively coupled to analog-to-digital converter 106; the digital data are returned to controller 102. Controller 102 is also communicatively coupled to EEPROM 107 (whose use is described below), a temperature sensor 108 for monitoring the temperature of sensor 10, and a plurality of LEDs 109, which indicate the operational status of sensor 10. Controller 102 transfers serial data to and from sensor 10 through differential receiver and transmitter 110 and serial connector 111. Serial connector 111 is communicatively coupled to control module 60 (depicted in FIG. 1) through cable 61.

When a range reading is requested, the following sequence of events takes place: A trigger signal is sent from control module 60 to sensor 10, and is received and processed by controller 102. Controller 102 turns on laser 16 through laser driver 103. The end of proper exposure of MOS detector 20 is indicated by saturation detector 105, which uses circuitry described in U.S. Pat. Nos. 5,519,204 and 5,665,958, incorporated herein by reference. At the end of exposure, laser 16 is turned off, and further clock signals are applied to MOS detector 20 to cause it to produce analog video signals corresponding to the pattern of light present on it during exposure. Clock signals are also applied during this readout phase, which reset the photosensitive elements for the next exposure. The video signals are digitized by analog-to-digital converter 106 and sent to the control module 60 for further processing. Control module 60 converts the raw video signals to a range reading, using algorithms to be described below, and sends the range reading to host processor 63.

Figure 6A:
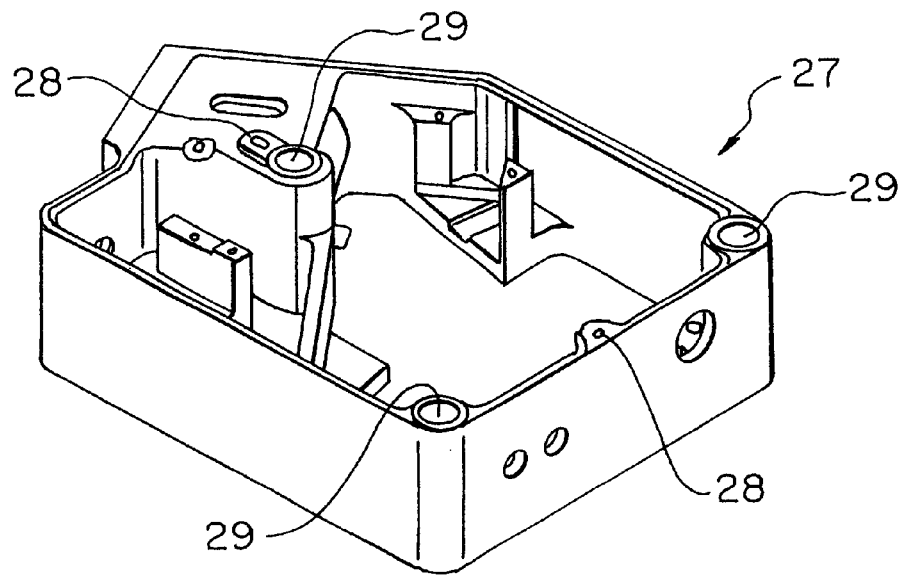
FIGS. 6A–6C depict a case for enclosing the digital range sensor of FIGS. 2 and 4.
Figure 6B:
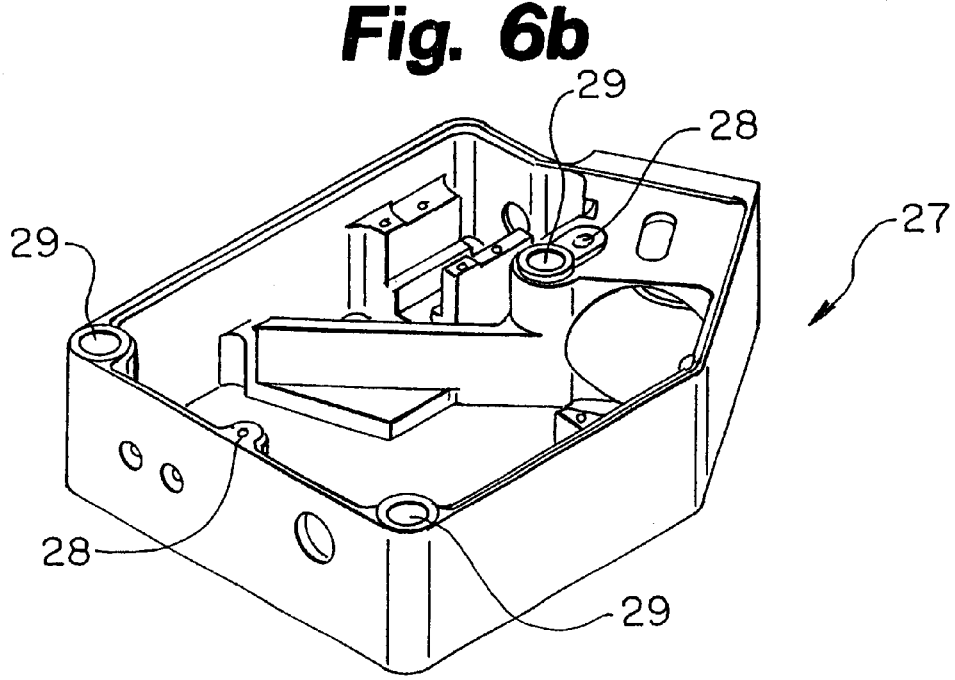
Figure 6C:
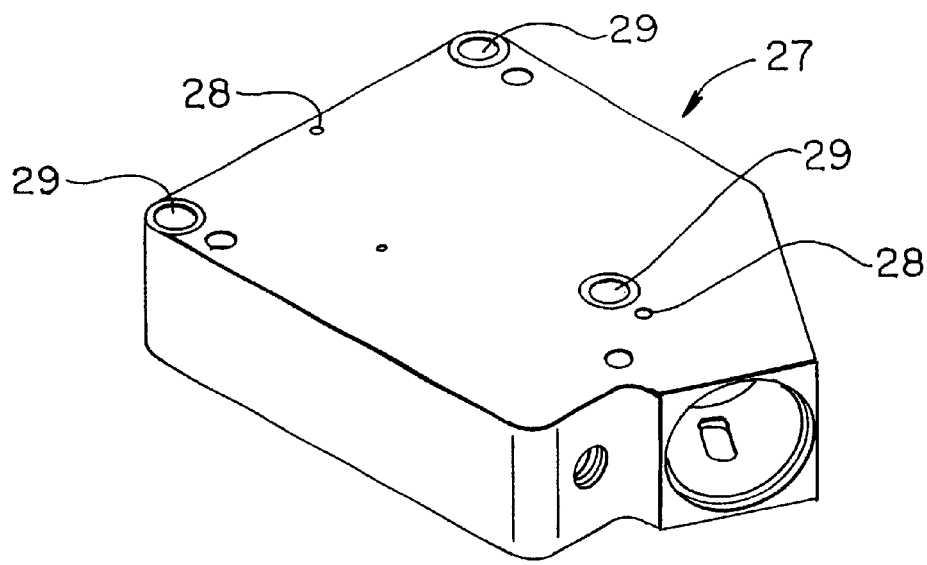
Figure 7A:
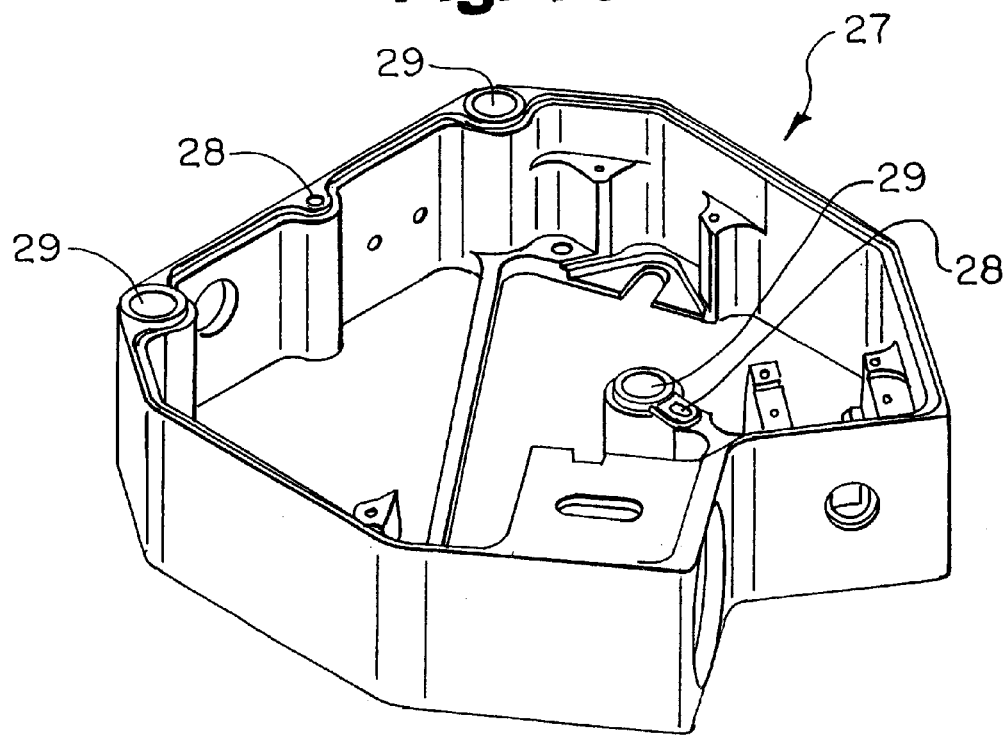
FIGS. 7A–7D depict a case for enclosing the digital range sensor of FIG. 3.
Figure 7B:
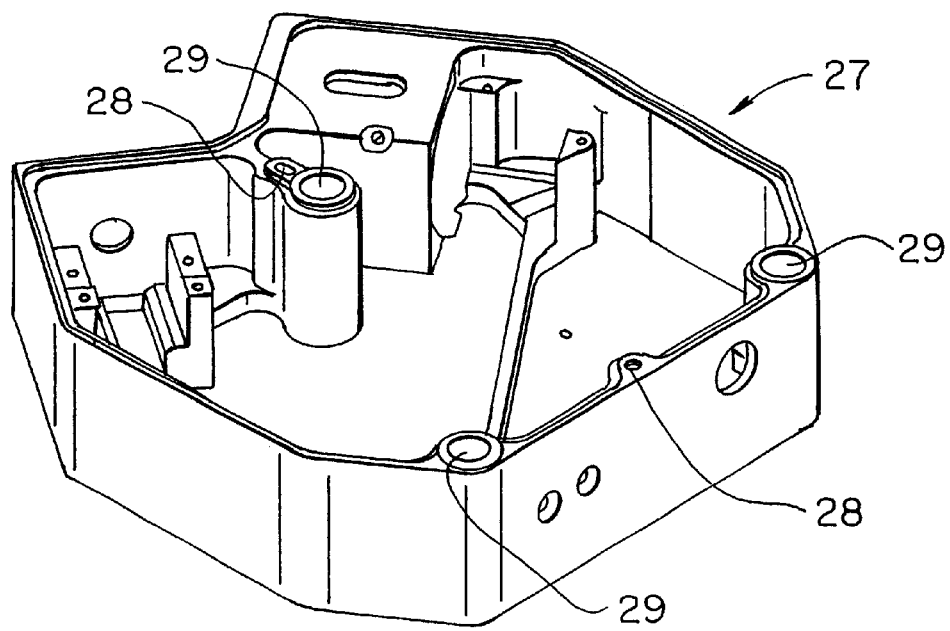
Figure 7C:
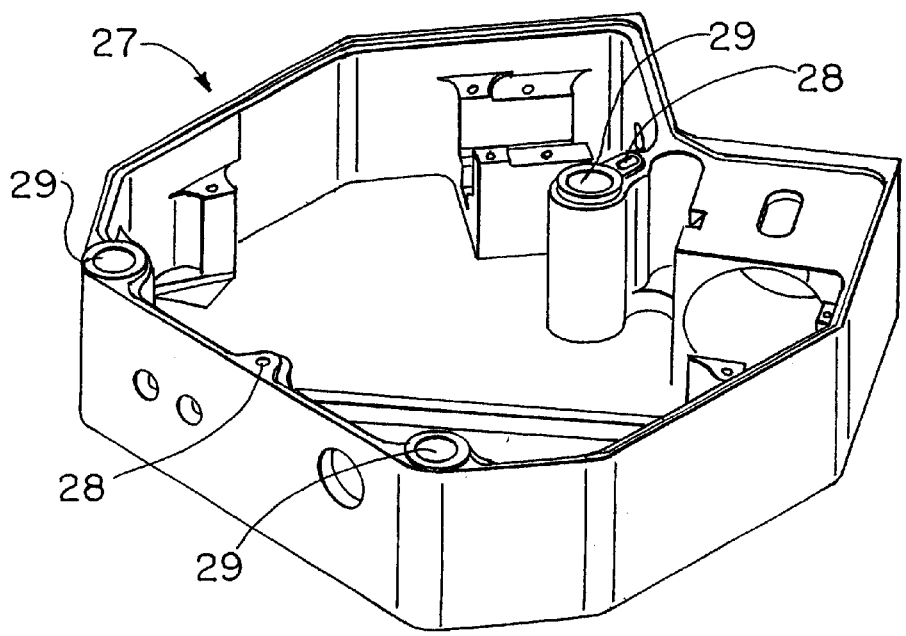
Figure 7D:
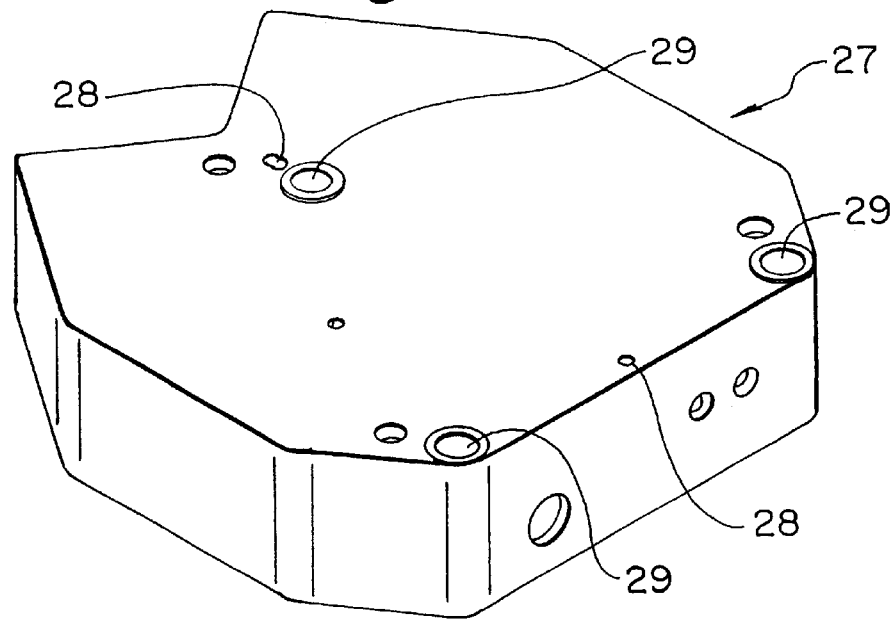

Digital range sensor 10, including sensor electronics 100, is preferably maintained within sensor case 27 as depicted in FIGS. 6 and 7. FIG. 6, comprising FIGS. 6A, 6B, and 6C which are a left perspective view of the interior of case 27, a right perspective view of the interior of case 27 and a left perspective view of the exterior of case 27, respectively, depicts the preferred case for digital range sensor 10 embodiments of FIG. 2. FIG. 7, comprising FIGS. 7A, 7B, 7C, and 7D which are a front left perspective of the interior of case 27, a rear left perspective of the interior of case 27, a right rear perspective of case 27, and a left rear perspective of the exterior of case 27, respectively, is the preferred case digital range sensor 10 embodiment of FIG. 3. Sensor case 27 provides unique advantages to sensor 10 in that sensor case 27 incorporates precision mounting holes 28 which enables a user to repeatably mount sensor case 27 in the appropriate and precise position. Further, the configuration of sensor case is unique in that it is designed to be stackable incorporating stackable features 29. The sensor case 27 may be stacked with other sensor cases which to allow expansion for multiple sensors 10 that operate at different working ranges. For example, sensor case 27 of FIG. 6 may be stacked with sensor case 27 of FIG. 7 even though the respective cases are of a slightly different configuration because mounting holes 28 and stackable features 29 are similarly positioned on each case 27. Further, sensor case 27 is designed to be flippable so that the case may be mounted with the interior side up or the exterior side up. The exterior of case 27, e.g. FIGS. 6C and 7D, is provided with a plurality of mounting holes 28 and stackable features 29 that are identically located to the placement of the mounting holes 28 and stackable features 29 on the interior of sensor case 27, e.g. FIGS. 6A and 7A, to ensure the flippability of case 27.

During the building of digital range sensor 10, calibration is performed on sensor 10. The nature of the calibration is to move a target along a known path that is approximately orthogonal to the target plane under test, and record the position of the spot on the detector 20 (in pixel space). The target position is preferably measured with an interferometer, and each measurement of the interferometer is correlated with the spot position on the detector in pixel space. Ideally, the graph of these two measurements would be a straight line. However, due to the nature of the optical system, and variations in the build cycle, the graph exhibits smooth and systematic deviations from linearity. As such, the graph of the actual position (reported by the interferometer) and the spot position on the detector 20 are taken and a least squares best fit operation is performed using a third order function preferably of the form:

$$y = a + bx + cx^2 + dx^3 \qquad (2)$$

where:
a=offset of sensor
b, c, d=best—fit function to the raw data
x=spot position on detector in pixel space
y=actual position of target in mm The coefficients of the third order function are then stored in EEPROM 107, shown in FIG. 5, in sensor 10 and to be loaded later into control module 60 upon initialization, or first use, of sensor 10. Storing of the calibration information in sensor 10 itself enables interchangeability of sensors with a single control module 60. For instance, one of several different types of sensors may be connected to a single control module 60. That single control module 60 can detect which type of sensor 10 is present from additionally stored information with EEPROM 107.

Control module 60 is preferably a Gen3 Control Module (GCM), which is an ISA card that resides within host processor 63. Control module 60 installs into an ISA bus 62 of host processor 63 and communicates with host processor 63 via the internal bus structure. Control module 60 contains a microprocessor 65 that controls the operation of sensor 10, performs data processing on detector 20 output and communicates with host processor 63.

The structure of the control module electronics 120 is depicted in the block diagram of FIG. 8. Microprocessor 65 communicatively utilizes SRAM 121 during its operations. Microprocessor 65 is communicatively coupled to input/output controller 122 which controls encoder counters 123, interrupt controller 124, sensor power supply 125 and dual port memory 126. Input/output controller 122 also operates LEDs 127 which indicate the status of the operation of control module 60. Microprocessor 65 is interfaced to encoder counters 123 which is connected to interrupt controller 124 and encoder jumpers and signal preprocessing block 128.

A step and direction, or encoder, signal is provided through motor encoder connector 129. Encoder jumpers and signal preprocessing block 128 notifies input/output controller 122 of the encoder type which in turn informs microprocessor 65. Encoder jumpers and signal preprocessing block 128 processes the encoder signal and feeds it to encoder counter 123. An interrupt from encoder counter 123 through interrupt controller 124 to microprocessor 65 indicates that sensor 10 should take a range measurement. This trigger actuation can be configured to signal sensor 10 to take readings at predetermined or regularly spaced positions. Alternatively, an outside trigger source, connected to control module electronics 120 through trigger connector 129, may send an interrupt signal through interrupt controller 124 to microprocessor 65 that sensor 10 should take a range measurement. In this manner, control module 60 has the capability of simultaneously monitoring two position indicators. In addition, control module 60 can return the range and can be triggered by an outside trigger to monitor up to four axis.

Microprocessor 65 transfers data to and from host processor 63 through dual-port memory 126 and data buffer 131. Data buffer 131 sends data to address register 132, which controls and stages the data transferred to data buffer 131 from dual-port memory 126. Data buffer 131 also transfers data to host processor 63 through ISA bus 62. Processor 63 communicates to control module 60 through ISA bus 62 and PLD decoding block 133 and PnP Interface 134.

As noted earlier, detector 20 of sensor 10 is a 256 element linear array. Each element of detector 20 produces a charge as a result of the light incident upon the elements, or pixels, of detector 20. These charges are converted to a voltage within detector 20 and are clocked out of detector 20 under control of sensor electronics 100. This analog data stream is then amplified, and digitized by 8-bit analog-to-digital converter 106. The result of the digitization is a serial data stream composed of 256 eight bit words which are sent to control module 60 via serial cable 61.

The control module 60 operates on the digital data stream with a post data processing algorithm 65 to produce a range measurement preferably in millimeters, which is then reported to the host processor 63. A flow chart of post data processing algorithm 65 is shown in FIG. 8. Preferably, all of the post data processing algorithm 65 resides in the firmware of the control module 60. Prior to turning the laser 16 on, a maximum exposure time is set. The automatic exposure circuitry will stop the exposure and begin transmitting data to control module 60 if enough light is received. If the maximum exposure is reached before enough light is received control module 60 terminates the exposure and sensor 10 begins transmitting data to control module 60. It is up to the user to determine if data resulting from "terminated" exposures should be used. The maximum exposure value is set by the user through user interface 64.

Reception of the digital data 142 is the first step performed in the post data processing algorithm of control module 60. Threshold function 143 is performed upon receiving the digital data stream from sensor 10. During threshold function 143, control module 60 applies a threshold filter to the data. Thresholding of the data allows the user to remove detector noise and unwanted reflections from the data. A threshold value is set by the user preferably through a software user interface 64 with host processor 63. Each pixel in the data is compared to the threshold value as indicated by decision block 144. If the pixel value is equal to or less than the threshold value, the pixel value is set to zero, block 145. If the pixel value is above the threshold value, the pixel value is maintained, block 146. The threshold value is preferably set in the range of 0 to 255. An alternative threshold function may be performed where the pixel comparison is replaced by subtracting the threshold value from each pixel value and then setting all resulting negative values to zero.

Threshold function 143 can be very useful in focusing in on a spot position, especially in the instance of secondary reflections. Each pixel in detector 20 produces a voltage that is proportional to the light incident upon it. When calculating a centroid of a spot in the presence of secondary reflections, the centroid measurement will tend to be skewed by those secondary reflections and will not produce the true center of the spot. Using threshold function 143, the secondary reflection can be removed from the calculation thus, allowing a better measure of the primary spot.

A window function 147 is preferably performed after threshold function 144. Window function 147 allows the user to restrict the area of detector 20 over which the light spot position is calculated by identifying which pixels are in the desired window. This is an artificial method for reducing the effective working range of detector 20 and is useful when tracking multiple spots on detector 20. The default window size is preferably the entire length of detector 20, or in other words, 256 pixels but can be reduced preferably by defining a start and an end pixel.

Edge function 148 applies to both the detector edge and the window edge (if multiple windows are used) and determines if the edge pixels of the detector 20 or its windows, contain data. If the edge pixels, do contain data an error message is sent to the host processor 63 and is utilized to determine the appropriate action which may include ignoring the error or retaking a measurement. Data in the edge pixels will produce an incorrect calculation in range measurement. If the edge pixels do not contain data, the microprocessor of control module 60 will continue to range calculation function 150.

Range calculation function 150 acts to find the center of the spot of light on detector 20, in the user defined window, by using a mathematical centroid calculation of the following form:

$$\text{Spot Position} = \frac{\sum_{i=1}^{256} I_i P_i}{\sum_{j=1}^{256} I_j} \quad (3)$$

where:
I=intensity in volts (digitized by A/D converter) for an element of the detector
P=pixel number of the detector The spot position in pixel space is determined by summing the total of all the intensities on the individual elements of detector 20 (expressed in the denominator of equation (3)) and dividing that value into the sum of the intensity of each element in the detector times the pixel number (expressed in the numerator of equation (3)). Intensity and pixel values are integer numbers, and the result of this calculation is a real number (non-integer). Therefore, the center of the spot position can be located to a fraction of a pixel, approximating 1/10 of a pixel.

After range calculation function 150, range conversion function 151 uses the coefficients, which were determined during calibration and stored in the EEPROM 107 in sensor 10, to convert the pixel spot position obtained from range calculation function 150 to a range position in millimeters. Data transfer function 152 then transfers the range position in millimeters to host processor 63 via internal bus 62.

Multispot algorithm 200 provides control module 60 with the ability to determine the position of multiple spots on detector 20. The position of each of these spots may be determined to a fraction of a pixel. This ability allows a class of measurements to be made that exceeds the capabilities of other triangulation sensors. For example, when sensor 10 is used to measure a clear piece of plastic, two spots appear on detector 20. One spot is reflected from the first, or top, surface of the clear plastic target while the second spot is reflected from the second, or bottom, surface of the clear plastic target. The intensity of the spots are different due to the amount of light that is reflected from each surface. The position of each spot is the range to each surface. The difference between the two ranges is the thickness of the clear plastic (note that the index of refraction and the angle of incidence must be taken into account and impacts the interpretation of the spot data).

Figure 10:
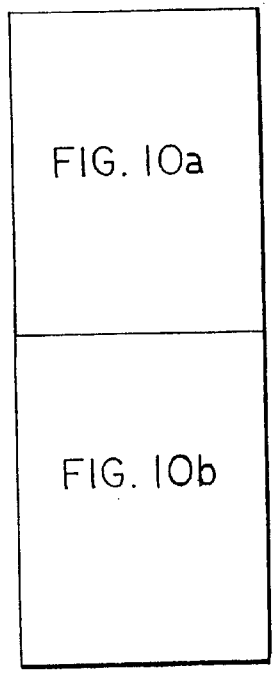
FIGS. 10A and 10B is a flowchart depicting the multi-spot function operation of the control module.
Figure 9:
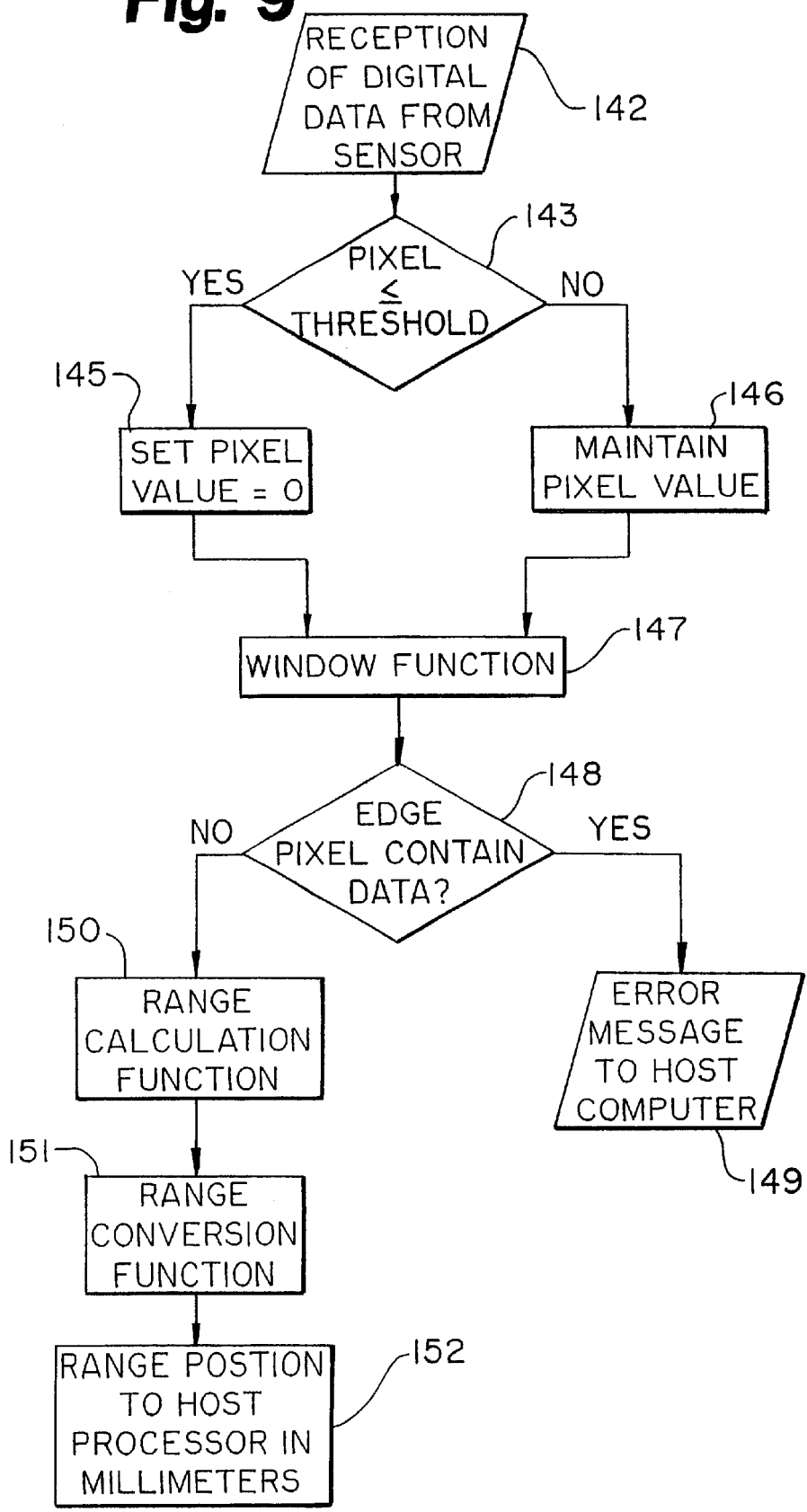
FIG. 9 is a flowchart depicting the operation of a control module that is in communication with the digital range sensor.
Figure 10A:
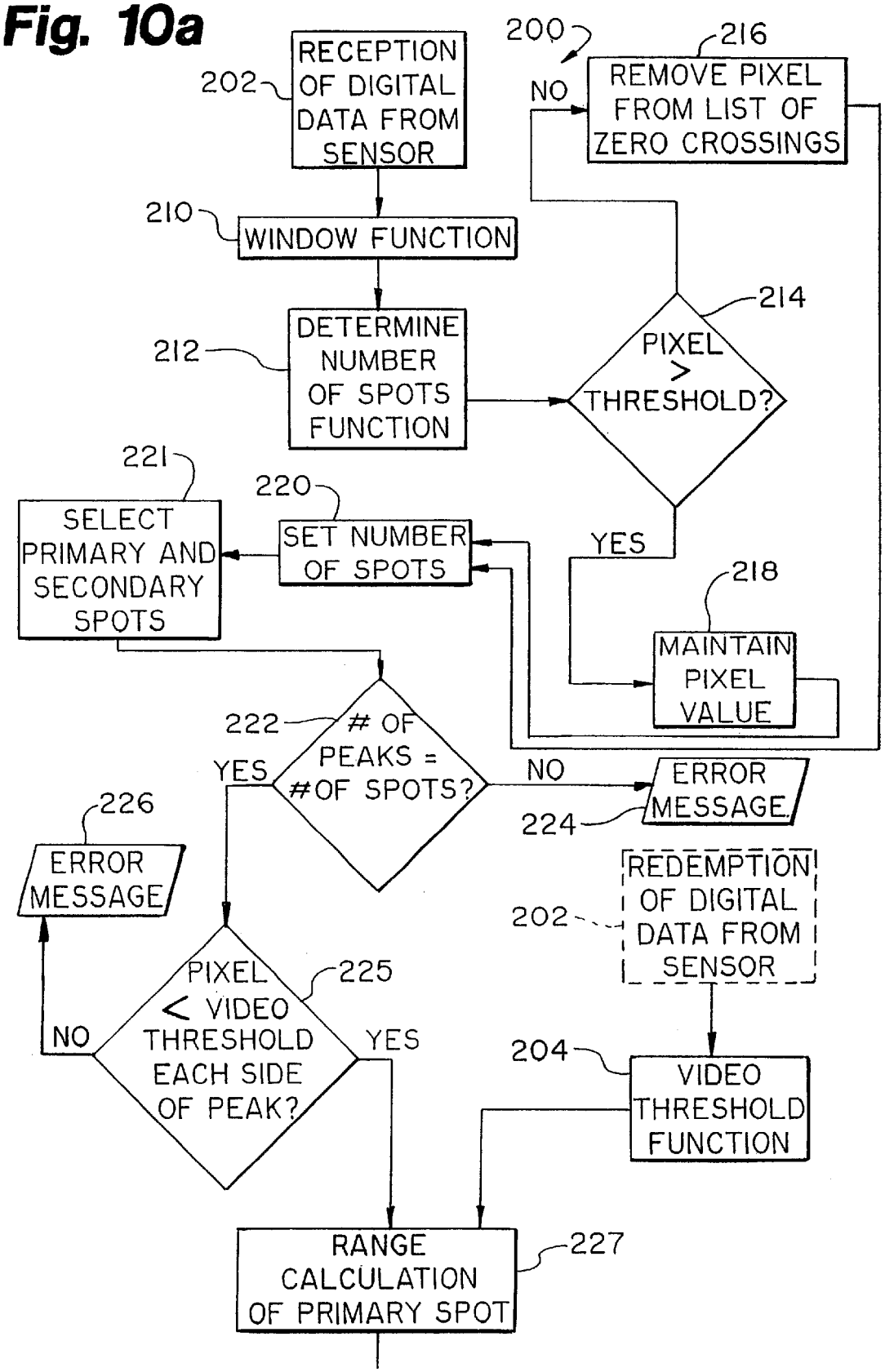
Figure 10B:
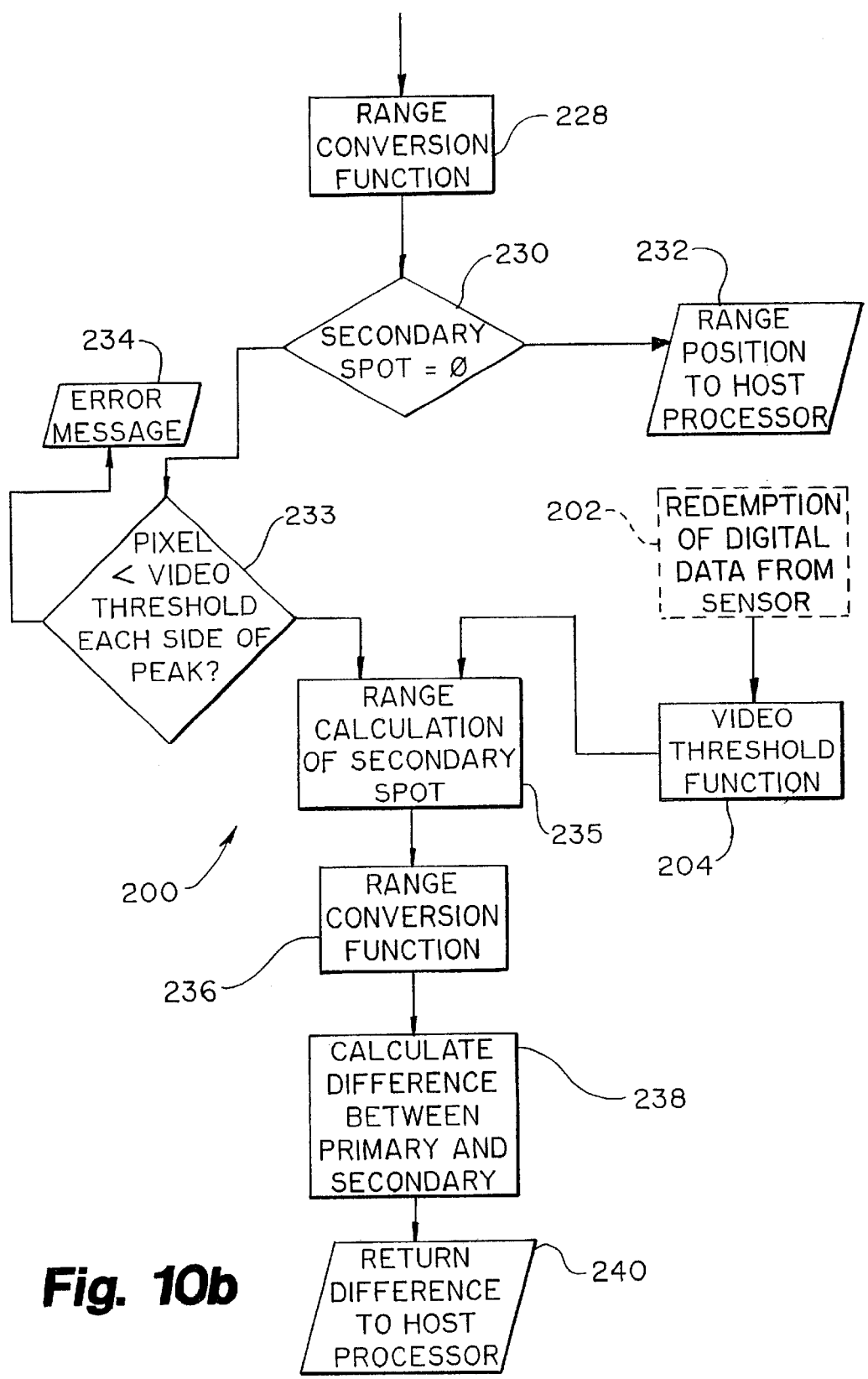

To determine the position of each spot on detector 20, the multi-spot algorithm 200 is used. The flow chart for the multi-spot algorithm is shown in FIG. 10 and comprises FIGS. 10A and 10B.

As with post data processing algorithm 65, the first step performed in the multi-spot algorithm 200 is the reception of digital data from sensor 10 as indicated in block 202. Video threshold function 204 is applied to the data. Video threshold function 204 is a threshold which operates on the entire detector array, with the intent of discarding noise that may be caused by spurious reflections and/or multi-path reflections. Without discarding the noise, the calculated center of the spot would be shifted and the accuracy of the range measurement would be significantly affected. The video threshold value is set by the user through user interface 64.

Window function 210 preferably is then applied. Window function 210 allows the user to restrict the area of detector 20 over which the multiple light spot positions will be calculated.

Next, function 212 determines the number of spots. The number of spots are determined by taking the first derivative of the digital data received from sensor 10 and determining the zero crossings of the data. In this manner, the peaks of the data and thereby, the number of spots within the windows can be determined.

Peak threshold function 214 is then performed on the zero crossings data. During peak threshold function 214, control module 60 checks that the pixel intensity at each zero crossing is greater than the peak threshold. If the pixel intensity is less than the peak threshold, that pixel is removed from the list of zero crossings, block 216. If the pixel intensity is equal to or greater than the peak threshold, the pixel intensity value is maintained, block 218. The threshold value is preferably set in the range of 0 to 255.

Next, the number of spots are set by the user, block 220, and a primary and a secondary spot are designated by the user, through software interface 64, as indicated in block 221. The primary spot may be selected as spot one through five while the secondary spot may be selected as spot zero through five; zero indicating no secondary spot is selected.

A check 222 is then performed by the firmware of control module 60 to determine if the number of peaks above the peak threshold is equivalent to the number of spots input by the user. If the number of peaks do not match the number of spots input, an error message 224 is delivered to host processor 63 and acted on accordingly. If the number of peaks match the number of spots input, control module 60 performs a peak window function 225 to determine the primary spot's peak window.

Peak window function 225 determines the primary spot's peak window by searching from the peak for the next location below the video threshold on both sides of the peak, or zero, location. If no pixels are found below the video threshold before the edge of the window or the next peak is reached, an error message 226 is produced and acted on accordingly. If pixels are found below the video threshold, the boundaries of the primary spot's peak window are thereby defined for range calculation function 227.

The range calculation function 227 operates to calculate the centroid of the primary spot within the boundaries of the primary spot's peak window. An equation similar to equation (3) above is used to determine the centroid, with the exception of limiting i and j to the number of pixels in the primary spot's peak window. The output of range calculation function 227 is the spot position in pixels.

After range calculation function 227, range conversion function 228 uses the coefficients, which were determined during calibration and stored in EEPROM 107 of sensor 10, to convert the pixel spot position of the primary spot from range calculation function 226 to a range position in millimeters.

A check 228 is then performed to determine if a secondary spot has indeed been selected. If there is no selected secondary spot, the range position of the primary spot in millimeters is returned to the host processor, block 232, for use and/or display. If a secondary spot has been selected, control module 60 performs a peak window function 233 to determine the secondary spot's peak window.

Peak window function 233 determines the primary spot's peak window by searching from the peak for the next location below the video threshold on both sides of the peak, or zero, location. If no pixels are found below the video threshold before the edge of the window or the next peak is reached, an error message 234 is produced and acted on accordingly. If pixels are found below the video threshold, the boundaries of the primary spot's peak window are thereby defined for range calculation function 235.

The range calculation function 235 operates to calculate the centroid of the secondary spot within the boundaries of the secondary spot's peak window. An equation similar to equation (3) above is used to determine the secondary spot centroid, with the exception of limiting i and j to the number of pixels in the secondary spot peak window. The output of range calculation function 235 is the spot position in pixels.

After range calculation function 235, range conversion function 236 uses the coefficients, which were determined during calibration and stored in EEPROM 107 of sensor 10, to convert the pixel spot position of the secondary spot from range calculation function 236 to a range position in millimeters.

Once the range positions of the primary spot and the secondary spot are determined, the difference between the spots is calculated, block 238, and returned to the host processor 64, block 240, for use and/or display. The individual range positions of the primary and secondary spots may also be returned to host processor 64 for use and/or display.

The multi-spot algorithm 200, allows the user to isolate one or two of five spots using the window function and set a peak threshold to select the spots to be used. The multi-spot routine can then determine the position of any of the five spots on detector 20 and determine the distance between any two spots, or the range of each of the spots.

The above-described sensor 10 and control module 60 is an optical sensor system that can produce precise measurements by reducing speckle through numerical aperture adjustment, has improved range-to-resolution and range-to-accuracy ratios and can simultaneously determine multiple spots of light on detector 20. The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A range sensor for making range measurements and determining the dimensions of a target, comprising:
    a light source for directing light along a path to said target;
    a transmitter within said light path for focusing the light onto said target;
    a receiver to gather the light reflected from the target and to focus the reflected light, said receiver having a substantially large numerical aperture;
    a detector having a detecting surface designed to detect the reflected light, and wherein said substantially large numerical aperture operates to substantially reduce speckle at said detecting surface; and
    at least one optical element constructed and arranged to reduce the incident angle of said reflected light with respect to said detector outside an image plane of said reflected light.

2. The range sensor of claim 1, wherein said substantially large numerical aperture operates to substantially reduce uncertainty in range measurements.

3. The range sensor of claim 1, wherein the numerical aperture of said receiver is $\geq 0.1$.

4. The range sensor of claim 3, wherein said numerical aperture is approximately 0.2.

5. The range sensor of claim 1, wherein said detector comprises a plurality of photo-sensitive elements.

6. The range sensor of claim 5, wherein said detector comprises a metal-oxide semiconductor linear array.

7. The range sensor of claim 1, wherein said detector has substantially low power dissipation of no greater than approximately 1.0 W.

8. The range sensor of claim 1, further comprising a serial port for communicatively coupling said range sensor to a control module.

9. The range sensor of claim 1, wherein said light reflected from said target is reflected along a path and wherein said receiver comprises a filter that is tilted relative to said path.

10. The range sensor of claim 9, wherein said filter is tilted to correct for aberrations.

11. The range sensor of claim 1, further comprising a sensor case for housing said light source, said transmitter, said receiver and said detector, and wherein said sensor case has a plurality of mounting holes to precisely and repeatably mount said sensor case.

12. The range sensor of claim 11, wherein said sensor case is designed to be both flippable and stackable.

13. The range sensor of claim 1, wherein calibration information is stored in said range sensor.

14. The range sensor of claim 13, wherein said calibration information comprises non-linearity information of said range sensor.

15. The range sensor of claim 1, wherein said range sensor has a range-to-resolution ratio of approximately $\geq 2000:1$.

16. The range sensor of claim 1, wherein said range sensor has a range-to-accuracy ratio of approximately $\geq 200:1$.

17. The range sensor of claim 1, wherein said light reflected from said target is reflected along a path and wherein said receiver comprises a filter constructed and arranged to block out unwanted wavelengths of light to minimize stray light sensitivity of the detector.

18. A range sensor for making range measurements and determining the dimensions of a target, comprising:
   a light source for directing light along a path to said target;
   a transmitter within said light path for focusing the light onto said target;
   a receiver to gather the light reflected from the target and to focus the reflected light, said receiver having a substantially large numerical aperture;
   a detector having a detecting surface designed to detect the reflected light, and wherein said substantially large numerical aperture operates to substantially reduce speckle at said detecting surface; and
   a filter constructed and arranged to block out unwanted wavelengths of light to minimize stray light sensitivity of the detector, wherein said filter is tilted to correct for aberrations.

19. The range sensor of claim 18, further comprising a sensor case for housing at least said light source, said transmitter, said receiver and said detector, said filter being constructed and arranged to seal said sensor case from dust.

20. The range sensor of claim 18, further comprising at least one optical element constructed and arranged to reduce the incident angle of said reflected light with respect to said detector outside an image plane of said reflected light.

21. A range sensor for making range measurements and determining the dimensions of a target, comprising:
   a light source for directing light along a path to said target;
   a transmitter within said light path for focusing the light onto said target;
   a receiver to gather the light reflected from the target and to focus the reflected light, said receiver having a substantially large numerical aperture;
   a detector having a detecting surface designed to detect the reflected light, and wherein said substantially large numerical aperture operates to substantially reduce speckle at said detecting surface;
   a filter constructed and arranged to block out unwanted wavelengths of light to minimize stray light sensitivity of the detector; and
   at least one optical element constructed and arranged to reduce the incident angle of said reflected light with respect to said detector outside an image plane of said reflected light.

\* \* \* \* \*